United States Patent [19]
Kirkby et al.

[11] Patent Number: 5,633,961
[45] Date of Patent: May 27, 1997

[54] SWITCHED OPTICAL INTERCONNECT

[75] Inventors: Paul A. Kirkby, Old Harlow; Piers J. G. Dawe, Sawbridgeworth, both of United Kingdom; Ernst A. Munter, Kanata, Canada

[73] Assignee: Northern Telecom Limited, Montreal, Canada

[21] Appl. No.: 451,135

[22] Filed: May 26, 1995

[30] Foreign Application Priority Data

May 26, 1994 [GB] United Kingdom ............ 9410544

[51] Int. Cl.$^6$ ............................................ G02B 6/26
[52] U.S. Cl. .............................. 385/16; 385/17; 385/24
[58] Field of Search .................................... 385/16–24

[56] References Cited

U.S. PATENT DOCUMENTS 5,369,514  11/1994  Eilenberger et al. ............ 385/17 X
5,438,444   8/1995  Tayonaka et al. ............... 385/24

FOREIGN PATENT DOCUMENTS 0317352  5/1989  European Pat. Off. ............ 385/16
0380126  8/1990  European Pat. Off. ............ 385/16

OTHER PUBLICATIONS

Inspec abstract No. B9407–6260–149, and full text.
Inspec abstract No. B9401–6260–199, and full text.
Inspec abstract No. B9302–6260–098, and full text.
Inspec abstract No. B91052451, and full text.
Inspec abstract No. B91012164, and full text.
Inspec abstract No. B90046231, and full text.
Ramaswami, "A Packet–Switched Multihop Lightwave Network Using Subcarrier . . . ", IEEE Transactions on Communications, vol. 42, No. 2–4, Feb. 1994, pp. 1198–1211.
Tada, "Design Consideration on a DBR–Laser Transmitter for Fast Frequency–Switching . . . ", Journal of Lightwave Technology, vol. 11, No. 5–6, May 1993, pp. 813–818.
Katsuyama, "Proposal on Adoption of Polarization–Controlled Switch for Survivable . . . ", Journal of Lightwave Technology, vol. 10, No. 10, Oct. 1992, pp. 1507–1512.
Glance, "Dense FDM Coherent Optical Switching System", Springer Series in Electronics and Photonics, vol. 29, 1990, pp. 266–273. Nov. 1990.
DeVera, "Suppression of Laser Frequency Drifts Caused by Thermal Transients in Optical . . . ", Electronics Letters, vol. 26, No. 23, Nov. 8, 1990, pp. 1030–1032.
Fujiwara, "A Coherenet Photonic Wavelength–Division Switching System for Broad–Band Networks", Journal of Lightwave Technology, vol. 8, No. 3, Mar. 1990, pp. 416–422.

*Primary Examiner*—Phan T. H. Palmer
*Attorney, Agent, or Firm*—Lee, Mann, Smith, McWilliams, Sweeney & Ohlson

[57] ABSTRACT

An ATM switch has an ATM switch core comprising an N×N optical cross-connect core and a set of N port cards, each including a selector. Associated with each port card is a satellite. Wavelength shift keyed signals that are wavelength division multiplexed are employed for routing ATM cells between the satellites via the core by way of optical fibres.

4 Claims, 8 Drawing Sheets

SWITCHED OPTICAL INTERCONNECT

BACKGROUND TO THE INVENTION

This invention relates to high speed optical interconnects, particularly the class of such interconnects that include at least one optical space switch.

Satisfactory technology currently exists for impressing data on an optical carrier at bit rates of up to about 10 Gbit/s without imposing excessive current requirements upon semiconductor components used to perform the switching at these speeds. Impressing data at still higher bit rates typically involves a penalty of increased current drive requirements that, for many applications, make operation at such higher speeds unattractive with currently available technology having regard for instance to the problems of increased heat dissipation.

If it is not convenient to increase the data handling capacity of an optical link by increasing, beyond a certain upper limit, the bit rate impressed upon a single carrier on a single transmission path, then other ways must be found. One expedient that can be employed is to distribute the traffic between more than one physically discrete transmission path, such paths being operated optically in parallel. Generally however there will be a not too large number of such physically discrete optical transmission paths that can satisfactorily be accommodated, and thus another limitation is reached. It may then be possible to get round this limitation by arranging to use wavelength multiplexing to impress more than one data-bearing channel on each transmission path.

In the case of a switched optical interconnect, in which switching may for instance be effected by semiconductor optical amplifiers, the physically discrete transmission paths are optically switched by optical space switches, and it is clear that an unnecessarily large number of space switched transmission paths will contribute to unnecessary complexity and expense. On the other hand the space switching of wavelength multiplexed signals (channels) on a common transmission path imposes its own cross-talk problems associated with the non-linearities of operation of such switches. In this context it will be appreciated that when a single physically discrete transmission path is switched that contains N wavelength multiplexed signals, the power level on that switched path may lie anywhere between the level pertaining in the situation where all N channels are in their low power state, and the level pertaining when they are all in their high level state.

SUMMARY OF THE INVENTION

An object of the present invention is to provide a switched optical interconnect in which cross-talk problems associated with non-linearities of operation resulting from fluctuations in power level in transmission paths containing wavelength multiplexed signals are avoided.

According to the present invention there is provided a switched optical interconnect in which data is transmitted from one location to another via at least one optical space switch in the form of wavelength shift keyed optical signals that are wavelength division multiplexed.

The invention also provides a method of switching data in which the data is fed to an optical space switch in the form of wavelength shift keyed optical signals that are wavelength division multiplexed.

This use of wavelength shift being superimposed on a system that is already wavelength division multiplexed serves to remove fluctuations in mean optical power level that are otherwise liable to occur in a wavelength multiplexed system without the wavelength shift keying. This removes a source of cross-talk associated with the use of elements in the interconnect that exhibit non-linearities, and it can also make the interconnect less vulnerable to common-mode cross-talk generation at both the transmitter end and the receiver end of the system.

BRIEF DESCRIPTION OF THE DRAWINGS

There follows a description of an ATM switch embodying the invention in a preferred form. The description refers to the accompanying drawings in which.

DETAILED DESCRIPTION OF PREFERRED EMBODIMENTS

Figure 1:
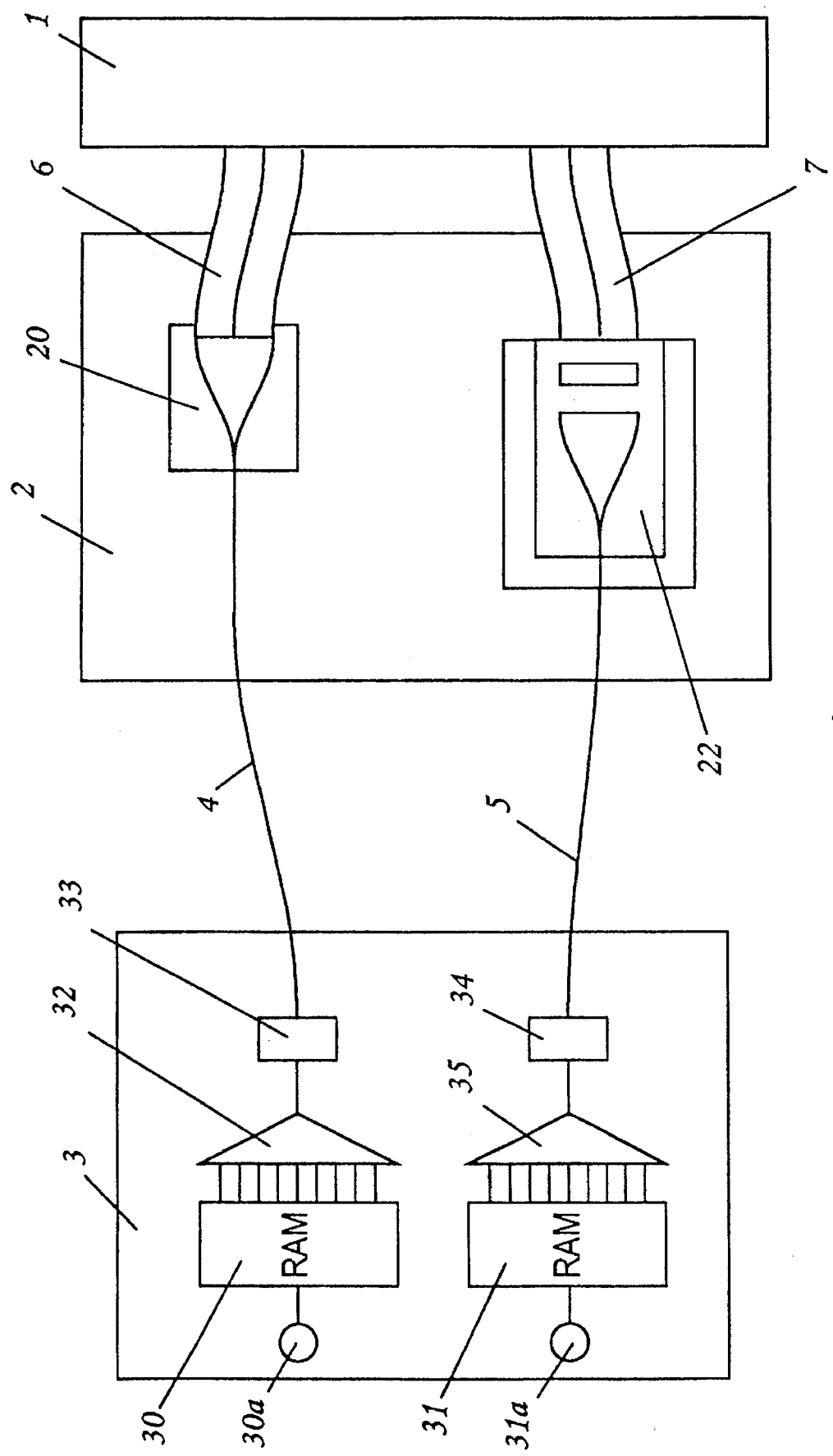
FIG. 1 is a block diagram illustrating the general architecture of the ATM switch.

At the heart of the interconnect of FIG. 1 is an ATM switch core comprising an N×N passive optical cross-connect core 1 and a set of N port cards 2, of which only one is illustrated in FIG. 1. Associated with the ATM switch core 1 is a set of up to N satellites 3, of which similarly only one is illustrated in FIG. 1. The N port cards 2, and the up to N satellites 3 may be arranged in stacks in which each individual port card 2 and satellite 3 occupies a different layer in its stack. For convenience of description those individual port cards and satellites will be treated as arranged in layers irrespective of whether or not that is their actual physical arrangement. (Thus, for instance, in practice it may be preferred for the cards to be arranged on edge in a side-by-side assembly rather than in a vertical stack.) Each satellite has an input random access memory (RAM) 30 and one output RAM 31, and each satellite is connected with its associated port card, which is at the same level, by means of an optical fibre 4 for the transmission of ATM cells from the satellite to its associated port card, and by means of an optical fibre 5 for the transmission of cells in the opposite direction. Particular input and output ports 30a and 31a are connected respectively to the input and output RAMs 30 and 31 of the different satellite layers. In the header of each ATM cell received by the interconnect is routing information specifying the output port to which the interconnect is required to direct that cell. This output port may happen to be the output port 31a connected with the output RAM 31 on the same satellite as the input RAM 30 that initially received the cell, but in general it will be one that is connected with the output RAM 31 on one of the other satellites. If the routing involves moving the cell from one satellite to another, this is achieved via the passive optical cross-connect, of the switch core. The cross-connect 1 may similarly be involved when the routing does not involve moving from one satellite level to another.

By means of a passive N-way optical splitter 20 associated with each of the port cards 2, the ATM cells that are applied to each of these port cards by way of its associated optical fibre 4 are applied equally to each of the N optical fibres of an associated N-way optical fibre ribbon 6 by which that port card is connected with one end of the passive optical cross-connect core 1. Each port card is similarly connected by means of an N-way optical fibre ribbon 7 with the other end of the cross-connect core 1. The internal 'wiring' of this passive optical cross-connect core 1 is such that one fibre of each ribbon 7 is optically coupled with one of the fibres of each of the N different ribbons 6. In this way each ribbon 7 supplies, to its associated port card 2, N different inputs, one corresponding to each one of the N different inputs applied to the N port cards 2 of the switch core by way of the N fibres 4. At each port card an optical selector 22 associated with that card selects which one of the N fibres of its associated fibre ribbon 7 should at any one time be optically coupled with fibre 5 in this way establishing an optical coupling between the fibre 5 of this level of port card and satellite and the fibre 4 of a selected (same or different) level of port card and satellite.

The ATM switch core, comprising the passive optical cross-connect core 1 and port cards 2, contains no buffering, and so the interconnect has to be operated so that the reading out of ATM cells from the RAMs 30, the switching of the space switches 22 and the writing of ATM cells into the RAMs 31 proceed with the appropriate synchronisation to achieve the desired cell routing. This is achieved by means of a logic unit (not shown) which is physically distributed between the different port cards 2, and which receives information from cell schedulers (not shown) which are located on the satellites 3, and which note the arrival of individual cells at the RAMs 20 and advise the logic unit of their respective destinations. Complete ATM cells read out from the RAMs 30, under the control of the logic unit are multiplexed in associated multiplexers 32 and fed to associated optical transmitters 33 whose optical outputs are optically coupled with the optical fibres 4. Similarly, the multiplexed ATM cells impressed on the optical signals delivered to the individual satellites 3 by way of their associated fibres 5, are fed to associated receivers 34 before being demultiplexed in associated demultiplexers 35 and written as complete individual ATM cells into their associated RAMs 31.

Figure 2:
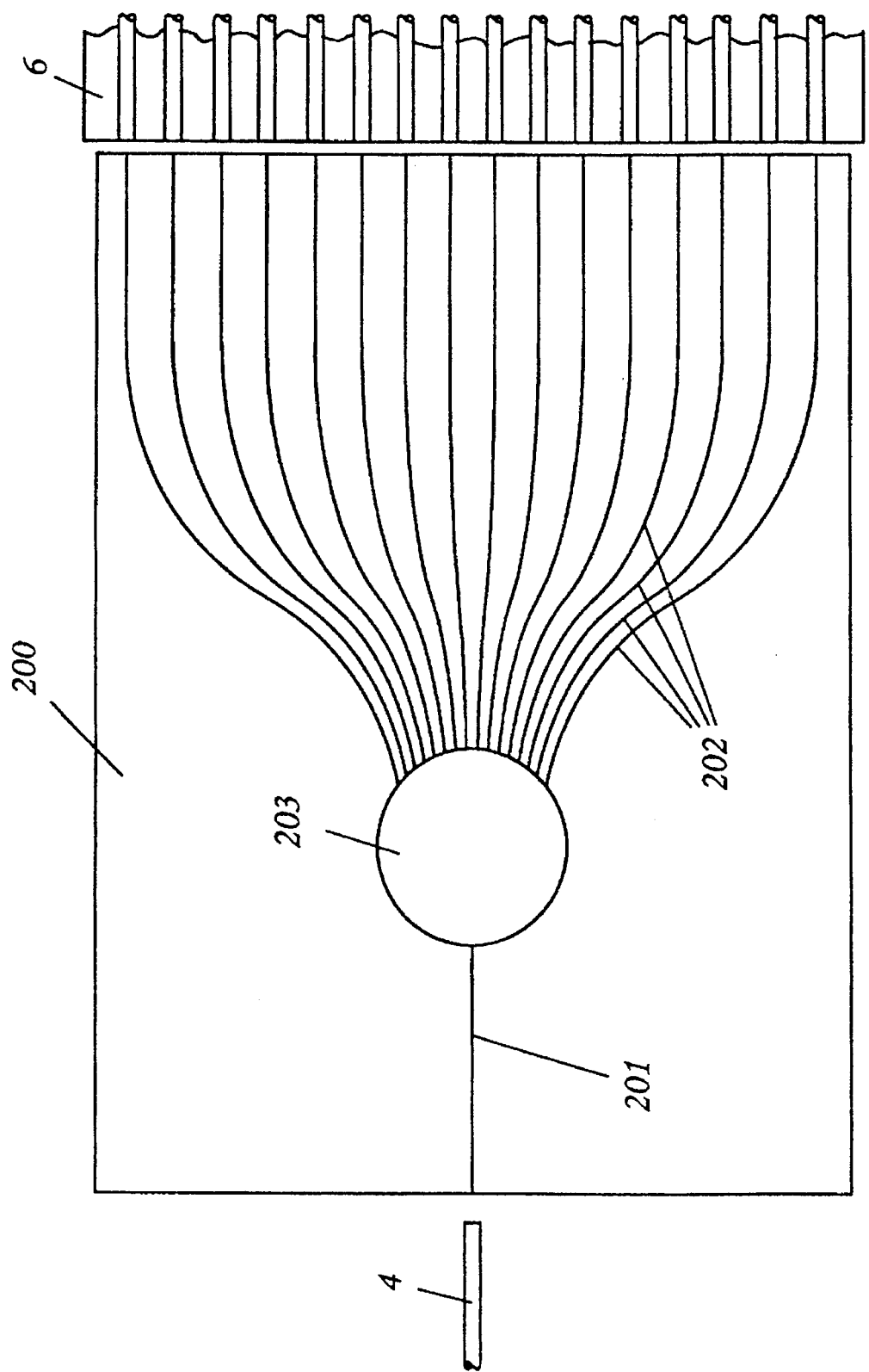
FIGS. 2 and 3 are schematic diagrams respectively of individual N-way splitters and space switches of the ATM switch of FIG. 1.

The passive N-way splitter 20 may be constructed in optical fibre format, or it may be constructed in an integrated optics format, as depicted in FIG. 2. In the integrated format of FIG. 2, a simple single mode optical waveguide 201 and a set of N single mode waveguides 202 are created in a substrate 200, the distal ends of these waveguides being respectively coupled with the single optical fibre 4 and the individual fibres of the optical fibre ribbon 6. Between the proximal ends of the waveguides 201 and 202 is a region 203, where there is no lateral waveguiding structure, but in which waveguiding is retained only in the direction normal to the plane in which the waveguides 201 and 202 extend.

In this region 203, light emerging from waveguide 201 spreads out laterally to cover the proximal ends of all N fibres 202.

Figure 3:
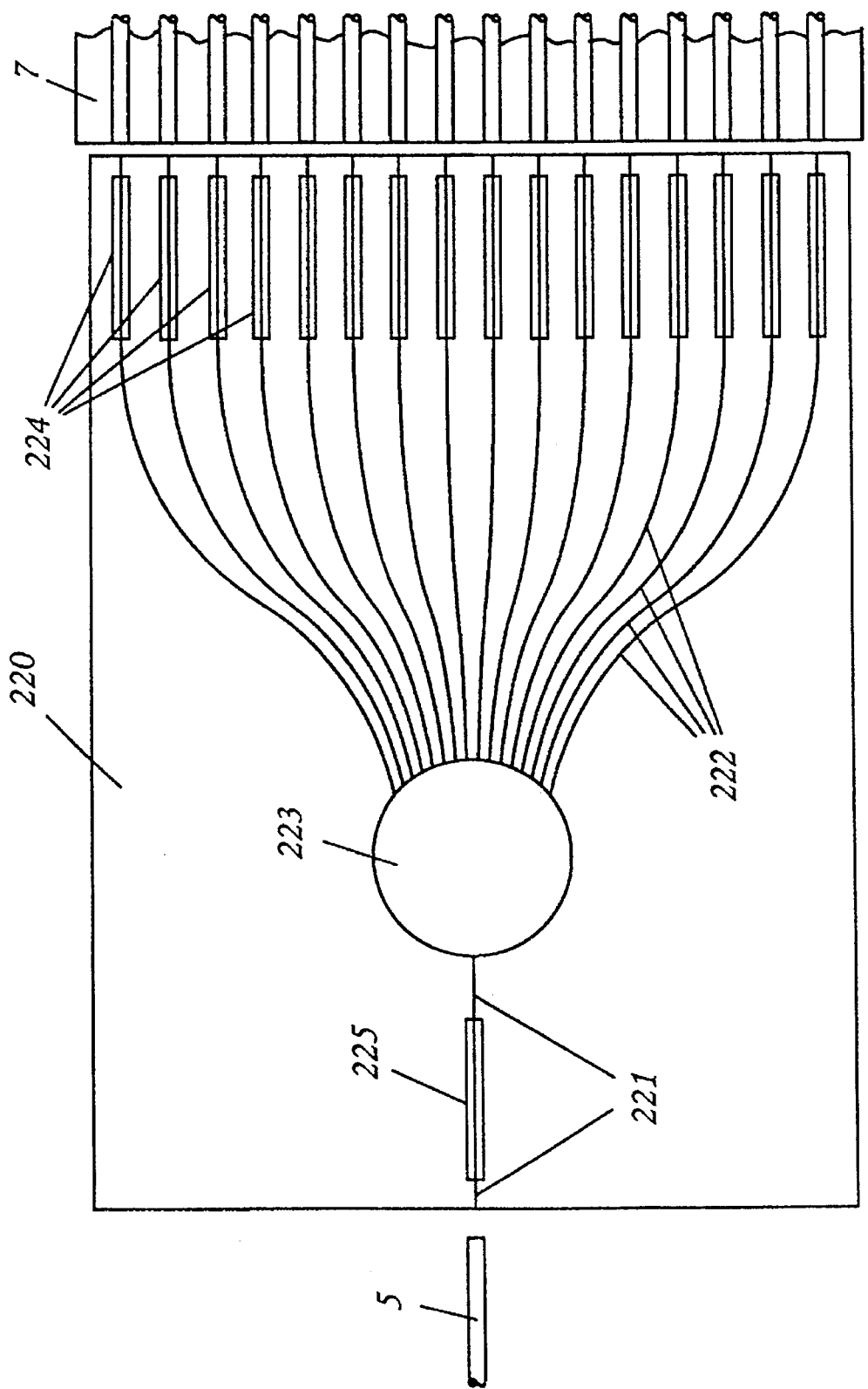

An integrated optics format of optical selector 22 as depicted in FIG. 3 has many features with their counterparts in the integrated optics splitter of FIG. 2. Thus the optical selector has waveguides 221 and 222 on a substrate 220, and a region 223 without a lateral waveguiding structure, having their counterparts respectively in waveguides 201 and 202 on substrate 200 with a region 203 having no lateral waveguiding structure. The principal difference is that each of the N waveguides 222 is provided with an associated amplifier 224. It is these amplifiers 224 which perform the switching function. Typically only one of the amplifiers 224 is energised sufficiently at any one time to render it either transparent or optically amplifying, while the energisation level applied to the other amplifiers 224 is at that time kept low enough to make them relatively highly optically absorbing. Optionally the waveguide 221 may include an amplifier 225. For convenience of illustration, the fibre of ribbons 6 and 7 in FIGS. 2 and 3 are shown in registry with, but spaced from, the waveguide 202 and 222 on the substrates 200 and 220. In practice however, a preferred way of achieving the requisite optical coupling between the individual fibres of the ribbons and the waveguides formed in the substrates is to house the ends of the fibres in grooves (not shown) photo lithographically etched in the substrates.

Figure 4A:
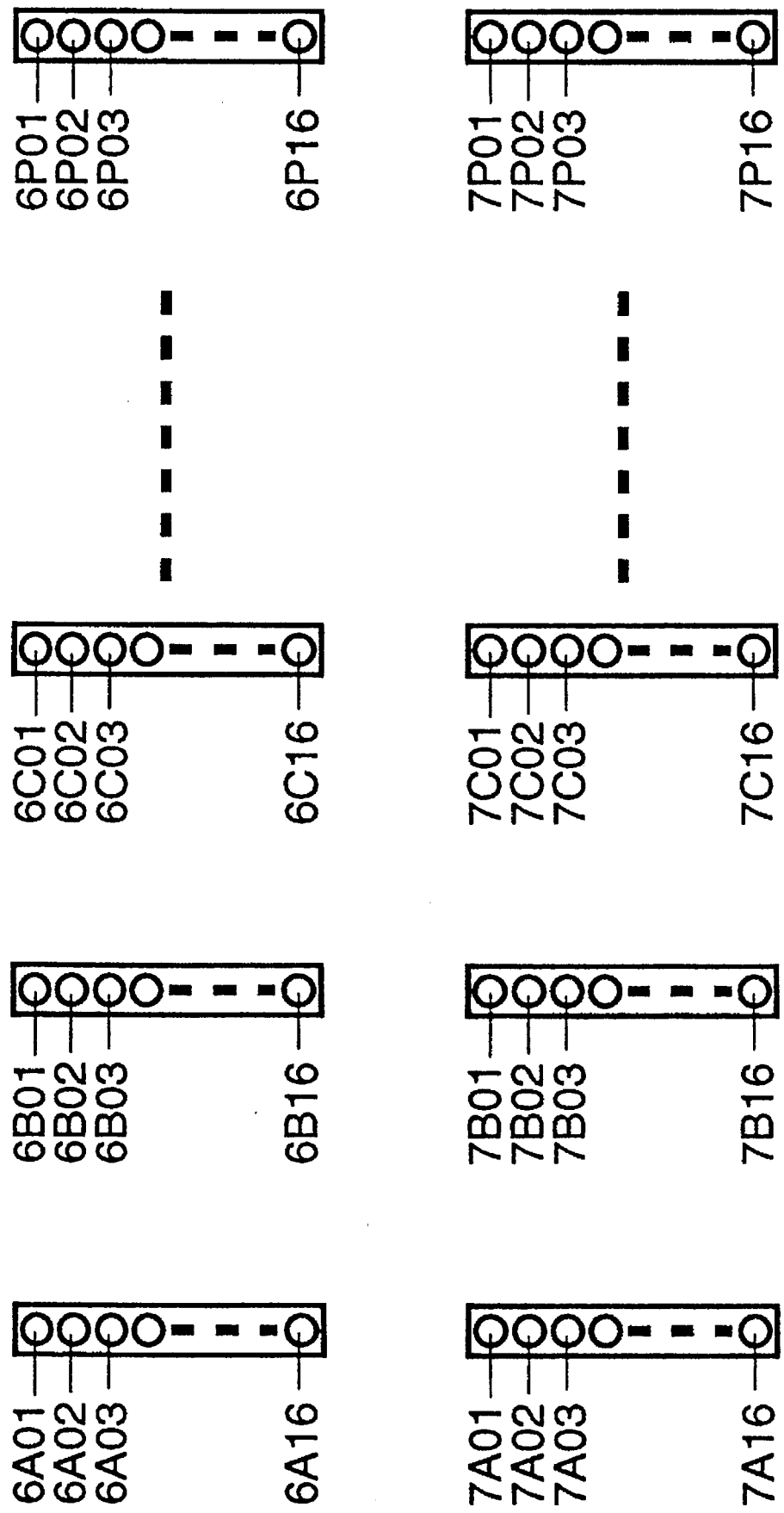
FIG. 4A is a diagram of the labelling nomenclature employed in the describing of the cross connect of the ATM switch of FIG. 1.

The function of the passive optical cross-connect core 1 is to connect one fibre of each of the N ribbons 6 with one of the N fibres of each of the N ribbons 7. For a better understanding of these interconnections of the core 1, reference may be made to the fibre labelling nomenclature set out in FIG. 4A. According to this nomenclature the individual fibres of the fibre ribbons 6 and 7 of the first port card 2 are labelled 6A01 to 6A16, and 7A01 to 7A16. Similarly those of second port card are labelled 6B01 to 6B16, and 7B01 to 7B16. The labelling continues in similar fashion to the sixteenth port card 2, the fibres of which are accordingly labelled 6P01 to 6P16, and 7P01 to 7P16. The preferred arrangement of interconnection provided by the core 1 is that in which the fibres of the ribbon 6 of the first port card 2 are connected according to the schedule:

6A01 is connected with 7A01, 6A02 with 7B01, 6A03 with 7C01, and so on till the connection of 6A16 with 7P01. The corresponding interconnections for the fibres of ribbon 6 of the second port card 2 are that 6B01 is connected with 7A02, 6B02 with 7B02, 6B03 with 7C02, and so on till the connection of 6B16 with 7P02. The interconnections for the succeeding port cards 2 proceeds in the same fashion so that in respect of the sixteenth port card 2, the interconnections are that 6H01 is connected with 7A16, 6H02 with 7B16, 6H03 with 7C16, and so on till the connection of 6H16 with 7H16.

A particular feature to be noted in respect of this preferred arrangement is that the arrangement is separable into subunits. This can be seen by looking for instance at the interconnections of the first four fibres of each ribbon 6 of the first four port cards 2. These are:

| | | | |
|---|---|---|---|
| 6A01 ⟷ 7A01 | 6B01 ⟷ 7A02 | 6C01 ⟷ 7A03 | 6D01 ⟷ 7A04 |
| 6A02 ⟷ 7B01 | 6B02 ⟷ 7B02 | 6C02 ⟷ 7B03 | 6D02 ⟷ 7B04 |
| 6A03 ⟷ 7C01 | 6B03 ⟷ 7C02 | 6C03 ⟷ 7C03 | 6D03 ⟷ 7C04 |
| 6A04 ⟷ 7D01 | 6B04 ⟷ 7D02 | 6C04 ⟷ 7D03 | 6D04 ⟷ 7D04 |

Figure 4B:
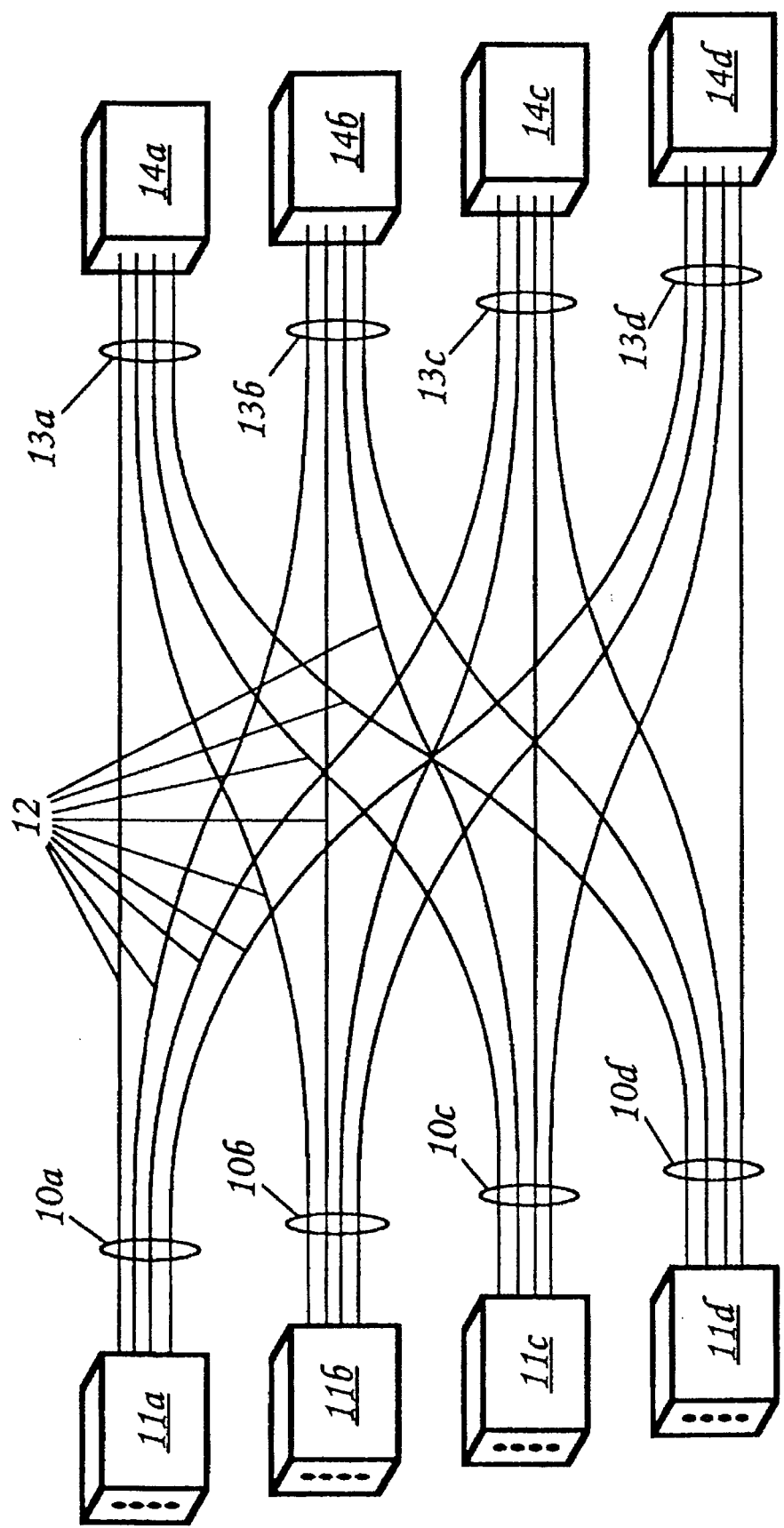
FIG. 4B is a schematic diagram of a subunit of the cross-connect of the ATM switch of FIG. 1, FIGS. 5A and 5B are schematic diagrams of alternative forms of an individual multiplexer of the ATM switch of FIG. 1.

Such a subunit can readily be constructed from a stacked array of four fibre ribbons, each of four fibres. Such an array of four fibre ribbons is schematically depicted in FIG. 4B, though for illustrative convenience these four ribbons, which are indicated generally at 10a, 10b, 10c, 10d, are shown spaced apart. At one end of the stack the fibre ribbons terminate in individual fibre ribbon terminations 11a to 11d. At the other end of the stack the individual fibres 12 are separated out from their respective ribbons and then reassembled into four new ribbons indicated generally at 13a to 13d, each similarly of four fibres, these new ribbons terminating in individual fibre ribbon terminations 14a to 14d. In an alternative construction (not illustrated) each of the two sets of four ribbon terminations 11 and 14 is replaced by a single termination accommodating all four ribbons. In a further alternate construction (not illustrated) the subunit has eight eight fibre ribbons instead of four four fibre ones.

In the case of this particular ATM switch it has been determined that increasing the number N of the port cards beyond 32 would introduce unacceptably increased complexity. On the other hand it is desired for the switch to be capable of handling traffic at a rate of 1.28 Terabits per second. Accordingly each of the 32 satellites 3 must be capable of sending and receiving traffic over its associated pair of optical fibres 4 and 5 at the rate of 40 Gbit/s. This traffic is wavelength multiplexed so that no individual channel of the wavelengths multiplexed signal is required to handle traffic at a rate in excess of 10 Gbit/s. It is clear that four-way wavelength multiplexing is sufficient to meet this target, but this would mean that the data on each of the four channels would be entirely independent of that on each of the other three channels. Accordingly the power level in the multiplexed transmission path would be liable to fluctuate anywhere between that pertaining to the concurrence of four low-level bits and that pertaining to the concurrence of four high-level bits. As explained previously, such power fluctuations are undesirable, particularly if the multiplexed signals are to be optically amplified in their multiplexed state. Accordingly eight-way wavelength multiplexing is actually chosen so that this problem can be avoided by arranging the eight channels in four pairs, one member of each pair carrying the inverse of the data of the other member. The two channels of such a pair can be created by driving two lasers in push-pull or, in some circumstances more conveniently, by frequency shift keying a single laser.

Figure 5A:
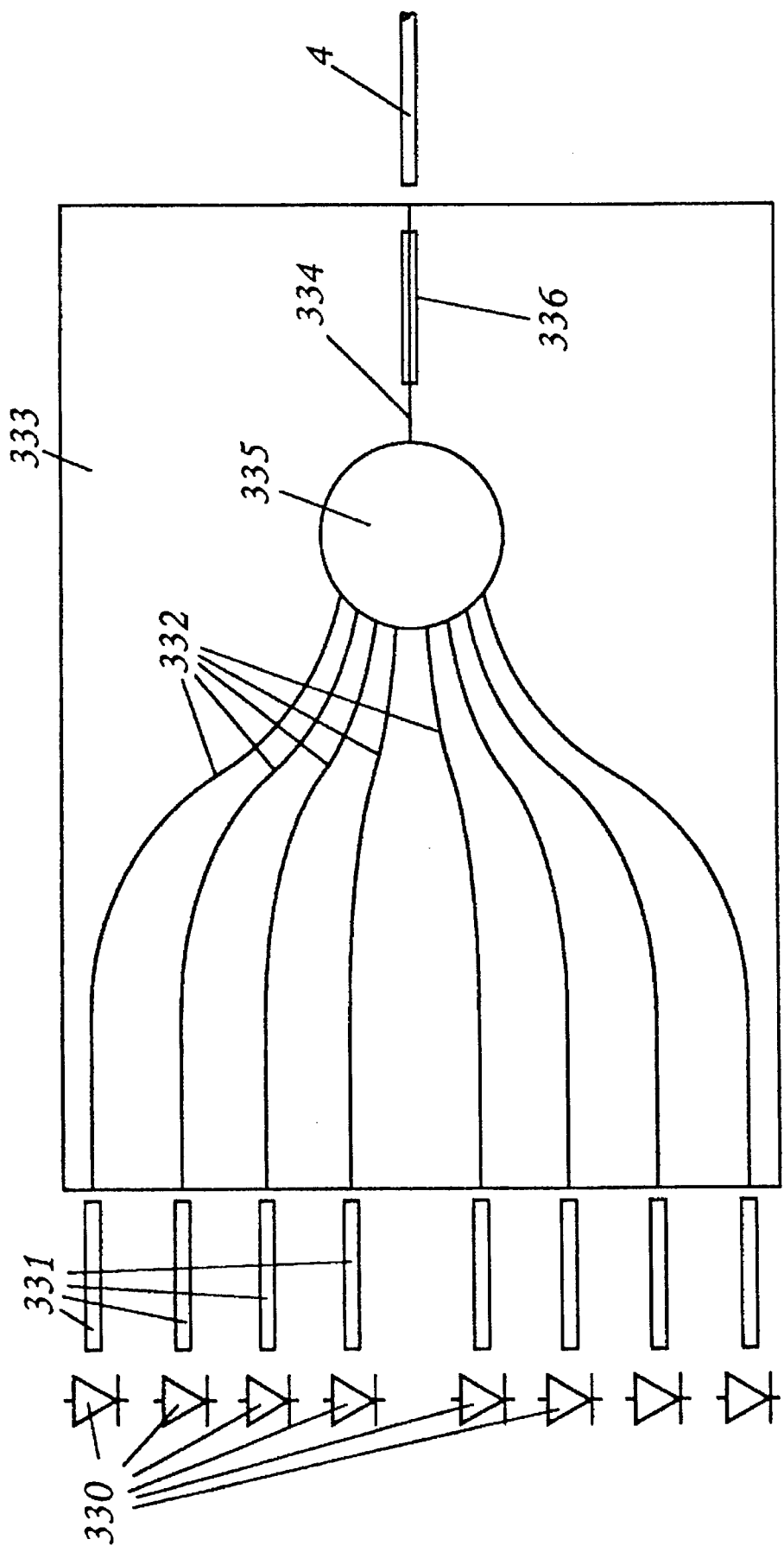
Figure 5B:
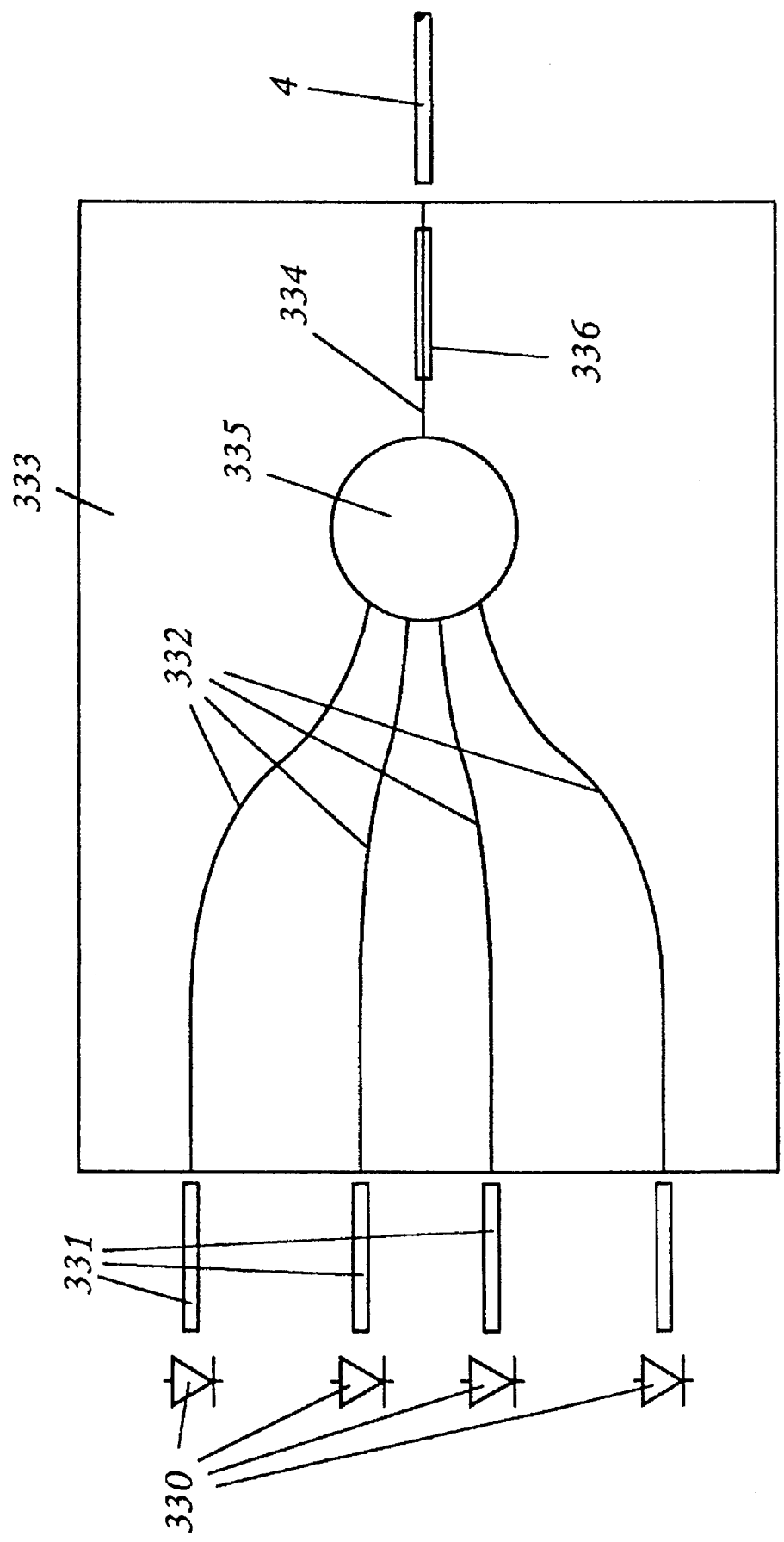

For the multiplexing of the eight channels of each satellite 3 on to a single associated optical fibre 4, it is not necessary to use a combiner that is specifically wavelength multiplexing. Suitable alternative forms of combiner for the transmitter 37 of a satellite 3 are depicted in FIGS. 5a and 5b which employ eight and four lasers 330 respectively. These lasers 330 are provided with fibre pigtails 331 which are coupled with individual members of a set of integrated optics waveguides 332 created in a substrate 333. The set of waveguides 332 are optically coupled with a single integrated optics waveguide 334 via a region 335 in which there is no lateral waveguiding structure, but in which waveguiding is retained only in the direction normal to the plane in which waveguides 332 and 334 extend. This form of combiner is lossy, and so an optical amplifier 336 may be included in waveguide 334. The distal end of waveguide 334 is optically coupled with optical fibre 4.

Attention is now turned to the wavelength demultiplexing of the eight channels supplied to the detector 34 of a satellite 3 from its associated port card via its associate single fibre 5. The incoming signal on fibre 5 has to be wavelength demultiplexed into eight physically separated channels and fed to eight physically separated channels for feeding to eight separate photodetectors 340 (FIG. 6) of the detector 34 (FIG. 1). These photodetectors 340 are preferably arranged in physically adjacent pairs, of which one member receives one of the 10 Gbit/s data streams, while the other member receives the inverse (complement) data stream. Under these circumstances the two outputs of each pair of photodetectors can conveniently be combined in push-pull configuration to give a single 10 Gbit/s output for onward feeding to the demultiplexer 35 (FIG. 1).

Figure 6:
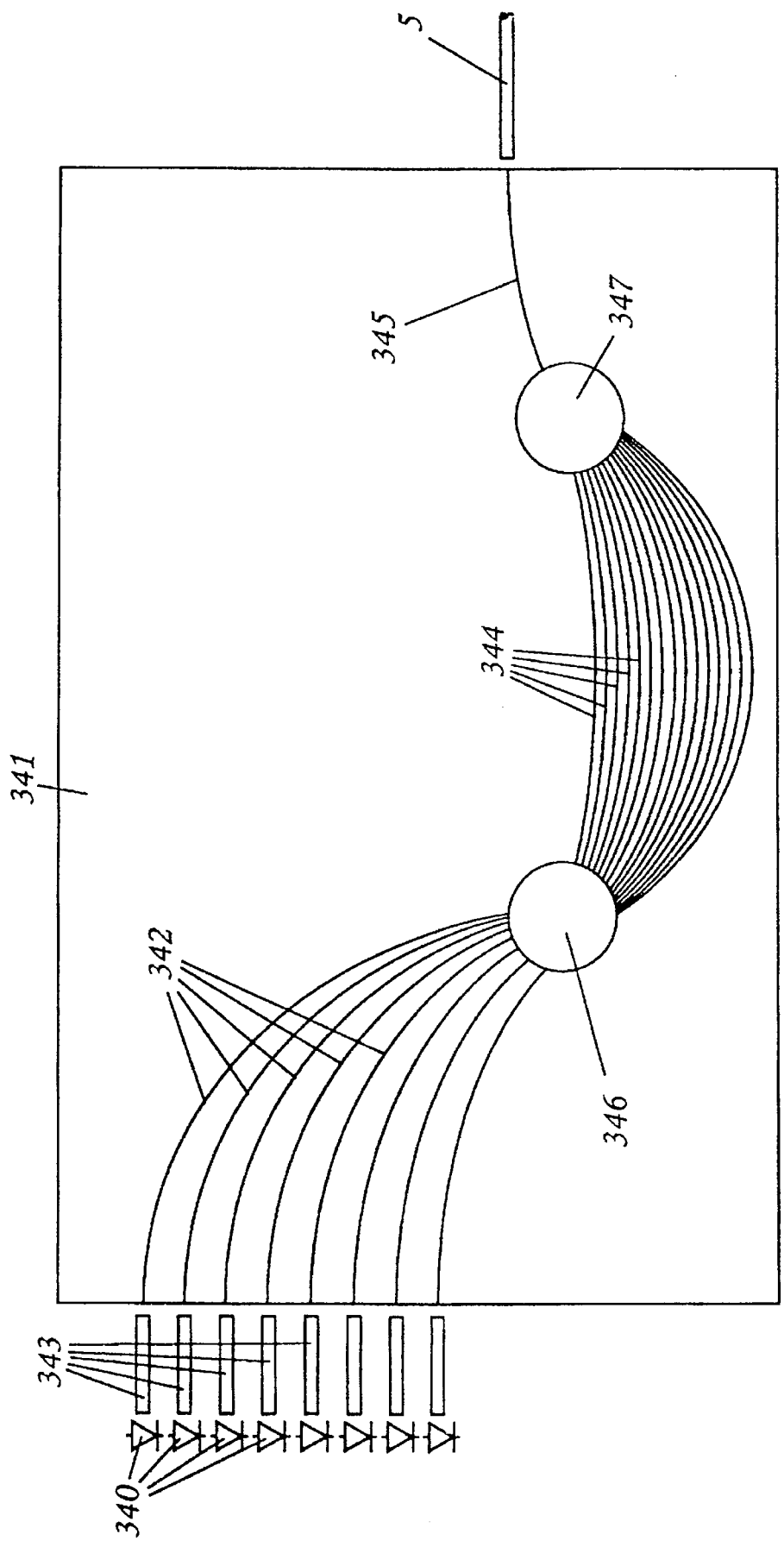
FIG. 6 is a schematic diagram of an individual demultiplexer of the ATM switch of FIG. 1.

FIG. 6 schematically illustrates an integrated optics demultiplexer of a type that employs radiative star couplers interconnected by an array of M uncoupled integrated optics waveguides of different length. This type of demultiplexer may be thought of as a kind of generalisation of a 2×2 Mach Zehnder demultiplexer where the M waveguides act as a kind of diffraction grating. For an analysis of the operation of this type of device reference may be made for instance to the paper by C. Dragone et al entitled, 'Integrated Optics N×N Multiplexer on Silicon', IEEE Photonics Technology Letters, Vol. 3, No. 10, Oct. 1991, pages 896–9. The demultiplexer of FIG. 6 has a substrate 341 in which are created a set of eight optical waveguides 342 optically coupled by fibre pigtails 343 with the eight photodetectors 340, a set of M waveguides 344, and a single waveguide 345 optically coupled with the single optical fibre 5 associated with the satellite to which this demultiplexer belongs. The two ends of the set of M waveguides 344 are respectively optically coupled with the set of eight waveguides 342 and the single waveguide 345 by regions 346 and 347 in which there is no lateral waveguiding structure, but in which waveguiding is retained only in the direction normal to the plane in which the waveguides 342, 344 and 345 extend so that these regions function as radiative star couplers.

In an alternative form of multiplexer the fibre pigtails that optically couple the eight waveguides 342 with the eight photodetectors 340 are dispensed with, and instead the photodetectors are mounted directly on, or are integrated with the substrate 341. The place of the interconnected radiative star couplers type demultiplexer may alternatively be taken by a diffraction grating type demultiplexer for instance of the type described in the specification of British Patent GB 2 222 891 B.

We claim:

1. A switched optical interconnect in which data is transmitted from one location to another via an optical space switch, which includes a plurality of optical amplifiers for performance of its switching function, each of which optical amplifiers is selectively energisable to convert it from an effectively non-transmissive state in which it is relatively highly absorbing to an effectively transmissive state in which it is substantially transparent or optically amplifying, in the form of wavelength shift keyed optical signals that are wavelength division multiplexed.

2. A switched optical interconnect as claimed in claim 1, which interconnect is an ATM switch.

3. A method of switching data in which the data is fed to an optical space switch, in which a switching function is effected by a plurality of optical amplifiers which are energised on a selective basis to convert selected amplifiers from an effectively non-transmissive state in which they are relatively highly absorbing to an effectively transmissive state in which they are substantially transparent or optically amplifying, in the form of wavelength shift keyed optical signals that are wavelength division multiplexed.

4. A method of switching data as claimed in claim 3 wherein the signals are ATM cells.

* * * * *